United States Patent
Tsujino et al.

(10) Patent No.: US 7,295,684 B2
(45) Date of Patent: Nov. 13, 2007

(54) IMAGE-BASED OBJECT DETECTION APPARATUS AND METHOD

(75) Inventors: Hiroshi Tsujino, Saitama (JP); Hiroshi Kondo, Saitama (JP); Shinichi Nagai, Saitama (JP); Koji Akatsuka, Saitama (JP); Atsushi Miura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 757 days.

(21) Appl. No.: 10/624,786

(22) Filed: Jul. 21, 2003

(65) Prior Publication Data

US 2005/0248654 A1    Nov. 10, 2005

(30) Foreign Application Priority Data

Jul. 22, 2002    (JP) .............................. 2002-212507

(51) Int. Cl.
 *G06K 9/00*    (2006.01)
(52) U.S. Cl. ...................... 382/107; 348/169; 382/103; 382/104; 382/206
(58) Field of Classification Search ................ 348/169; 382/103, 104, 107, 190, 206
See application file for complete search history.

(56) References Cited

U.S. PATENT DOCUMENTS

| | | | |
|---|---|---|---|
| 5,761,334 A * | 6/1998 | Nakajima et al. | 382/132 |
| 6,137,910 A * | 10/2000 | Shinagawa et al. | 382/195 |
| 6,185,337 B1 * | 2/2001 | Tsujino et al. | 382/227 |
| 6,421,463 B1 * | 7/2002 | Poggio et al. | 382/224 |
| 6,452,628 B2 * | 9/2002 | Kato et al. | 348/333.12 |
| 6,782,132 B1 * | 8/2004 | Fogg | 382/232 |
| 7,062,071 B2 * | 6/2006 | Tsujino et al. | 382/103 |
| 7,221,797 B2 * | 5/2007 | Koshizen et al. | 371/190 |
| 2005/0248654 A1 * | 11/2005 | Tsujino et al. | 348/169 |

FOREIGN PATENT DOCUMENTS

| | | |
|---|---|---|
| EP | 1282077 A2 * | 2/2003 |
| JP | 07-249127 | 9/1995 |
| JP | 11-219436 | 8/1999 |
| JP | 2000-082145 | 3/2000 |
| JP | 2000-242797 | 9/2000 |

* cited by examiner

*Primary Examiner*—Gregory M Desire
(74) *Attorney, Agent, or Firm*—Fenwick & West LLP

(57) ABSTRACT

An object detection apparatus and method capable of detecting objects based on visual images captured by a self-moving unit. A sequential images output section makes a train of a first input image and a second input image sequential to the first input image and outputs said train. A local area image processor calculates local flows based on said first input image and said second input image. An inertia information acquiring section measures self-motion of the unit to calculate inertia information thereof. A global area image processor uses said inertia information to estimate global flow, which is a motion field of the entire view associated to the self-motion, using said global flow and said first input image and creates a predictive image of said second input image. The global area image processor then calculates differential image data, which is a difference between said predictive image and said second input image. A figure-ground segregation section uses said differential image data to refine said local flows and compares the refined local flows with a predetermined threshold value to extract a figure candidate area, which is the area having a high probability of an object existing in the input image. An object presence/absence determination section determines presence/absence of objects in said figure candidate area.

15 Claims, 14 Drawing Sheets

FIGURE 3A
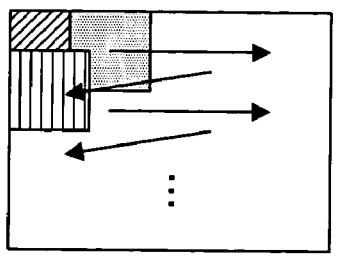
FIGURE 3B
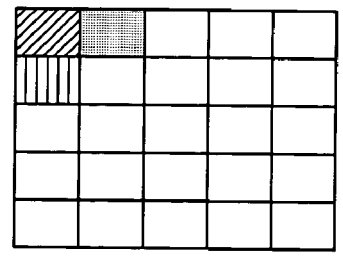
FIGURE 4A
UPWARD DIRECTION dw MAP ( ↑ )
| 3 | 3 | 4 | 4 | 0.5 |
|---|---|---|---|---|
| 0.5 |   | ... |   |   |
|   |   |   |   |   |
|   |   |   |   |   |
|   |   |   |   |   |
FIGURE 4B
LEFTWARD DIRECTION dw MAP (←)
| 1 |   |   |   |   |
|---|---|---|---|---|
| 1.5 | 1.5 | ... |   |   |
| 1 | 1 |   |   |   |
| 0.5 |   |   |   |   |
|   |   |   |   |   |
FIGURE 5A
MAXIMUM dw MAP
| 3 | 3 | 4 | 4 | 0.5 |
|---|---|---|---|---|
| 1.5 | 1.5 |   |   |   |
| 1 | 1 | ... |   |   |
| 0.5 |   |   |   |   |
|   |   |   |   |   |
FIGURE 5B
MAXIMUM DIRECTION MAP
| ↑ | ↑ | ↑ | ↑ | ↑ |
|---|---|---|---|---|
| ← | ← |   |   | → |
| ← | ← | ... |   | → |
| ← |   |   |   | → |
| ↓ | ↓ | ↓ | ↓ | ↓ |

A PORTION OF THE INPUT IMAGE
EACH SQUARE REPRESENTS 1 PIXEL

IMAGE-BASED OBJECT DETECTION APPARATUS AND METHOD

TECHNICAL FIELD

The present invention relates to an image-based object detection apparatus and method, and more particularly to an object detection apparatus and method capable of detecting objects based on visual images captured by a self-moving unit.

BACKGROUND OF THE INVENTION

Some techniques for detecting objects in captured images based on visual images are known in the art. For example, there is a method for calculating optical flows from captured sequential images and detecting a part of image corresponding to an object within area having same motion components. Since this can easily detect a moving object in the image, many object detection apparatus employs such method (for example, Japanese unexamined patent publication (Kokai) No. 07-249127)

However, when an imaging device for capturing images is moving (for example, when the imaging device is mounted onto an automobile or the like), it would be difficult to detect the moving object in the image accurately because some optical flows associated to the self-motion of the device is generated in the image. In such cases, if a motion field of the entire view associated to the self-motion are removed from the optical flows, the moving object in the image may be detected more accurately. For example, in Japanese unexamined patent publication No. 2000-242797, a motion detection method is disclosed where a variable diffusion coefficient is used when detecting optical flows in the image by means of a gradient method. According to this method, the diffusion coefficient is not fixed as in the conventional arts but compensated under some conditions, thereby noise resistance may be improved and differential of optical flows around object boundaries may be emphasized.

According to the method mentioned above, optical flows of the moving object, which is detected relatively easily, may be calculated accurately. However, when a stationary object on a stationary background is observed from a self-moving unit, it is difficult to segregate optical flows of the stationary object from that of the background. In this case, since the stationary object on the stationary background is recognized as a part of the background, optical flows are not emphasized and therefore the stationary object cannot be detected accurately.

Therefore, there is a need for an object detection apparatus and method capable of detecting stationary objects accurately based on images captured by a self-moving unit.

SUMMARY OF THE INVENTION

According to the present invention, an object detection apparatus for detecting objects based on visual images captured by a self-moving unit is provided. The apparatus performs global area image process for recognizing a motion field of the entire view associated to the self-motion and segregating an area incoherent with said motion field, and local area image process for calculating local flow information in the visual images in parallel. The apparatus refers to results of both processes mutually to improve the accuracy of object detection.

According to one aspect of the present invention, the object detection apparatus comprises:

a sequential images output section for making a train of a first input image and a second input image sequential to the first input image and outputting said train;

a local area image processor for calculating local flows based on said first input image and said second input image;

an inertia information acquiring section for measuring self-motion of the unit to calculate inertia information thereof, a global area image processor for using said inertia information to estimate global flow, which is a motion field of the entire view associated to the self-motion, using said global flow and said first input image to create a predictive image of said second input image and calculating differential image data, said differential image data being a difference between said predictive image and said second input image;

a figure-ground segregation section for using said differential image data to refine said local flows, comparing the refined local flows with a predetermined threshold value to extract a figure candidate area, said figure candidate area being the area having a high probability of an object existing in the input image; and an object presence/absence determination section for determining presence/absence of the object in said figure candidate area.

Global area image process for calculating the differential image data roughly segregating the input image into area based on self-motion ("ground") and another area ("figure") and local area image process for calculating the local flows in the input image are performed in parallel. The differential image data is used to refine the local flows, thereby the accurate object detection may be realized.

A warp estimation method may be employed for creating the predictive image by warp-converting the first input image based on phase shifts of each pixel calculated from the global flow. Therefore, in an environment in which the global flow can be estimated, the object may be detected without any learning in advance.

The global flow is estimated from inertia information. If the accuracy of the global flow increases, the accuracy of the predictive image created using the warp estimation method increases, which result in the accurate object detection. Therefore, according to another aspect of the present invention, the figure-ground segregation section uses local flows and the differential image data calculated by the global area image processor to refine the global flow. The global area image processor re-creates the predictive image of the second input image based on the refined global flow and the first input image and calculates the refined differential image data.

According to another aspect of the present invention, the object detection apparatus comprises:

a sequential images output section for making a train of a first input image, a second input image and a third input image sequential to the first input image and outputting said train;

a local area image processor for calculating local flows based on said first input image and said second input image;

a global area image processor for constructing an eigenspace for the input image in advance, projecting said first input image and said second input image on said eigenspace to create a predictive image of said third input image, and calculating differential image data which is a difference between said predictive image and said third input image;

a figure-ground segregation section for using said differential image data to refine said local flows, comparing the refined local flows with a predetermined threshold value to extract a figure candidate area, said figure candidate area being the area having a high probability of an object existing in the input image; and an object presence/absence determining section for determining a presence/absence of the object in said figure candidate area.

During learning, the eigenspace (referred to self-motion predictive space) is created based on the train of two or more sequential input images. At the time of executing the object detection, the eigenspace is used to create a predictive image. Therefore, even in an environment where the global flow cannot be estimated, accurate object detection may be achieved.

The eigenspace including global flow and inertia information may also be estimated. In this case, the global flow and the inertia information are also required in addition to the input images to create the predictive image.

BRIEF DESCRIPTION OF THE DRAWINGS

FIGS. 3A and 3B are diagrams illustrating correspondence between positions of local area and coordinates in a map;

FIGS. 4A and 4B illustrate examples of dw maps for each direction;

FIG. 5A illustrates an example of a maximum dw map;

FIG. 5B illustrates an example of a maximum direction map;

DETAILED DESCRIPTION OF THE PREFERRED EMBODIMENTS

First Embodiment of the Invention

Figure 1:
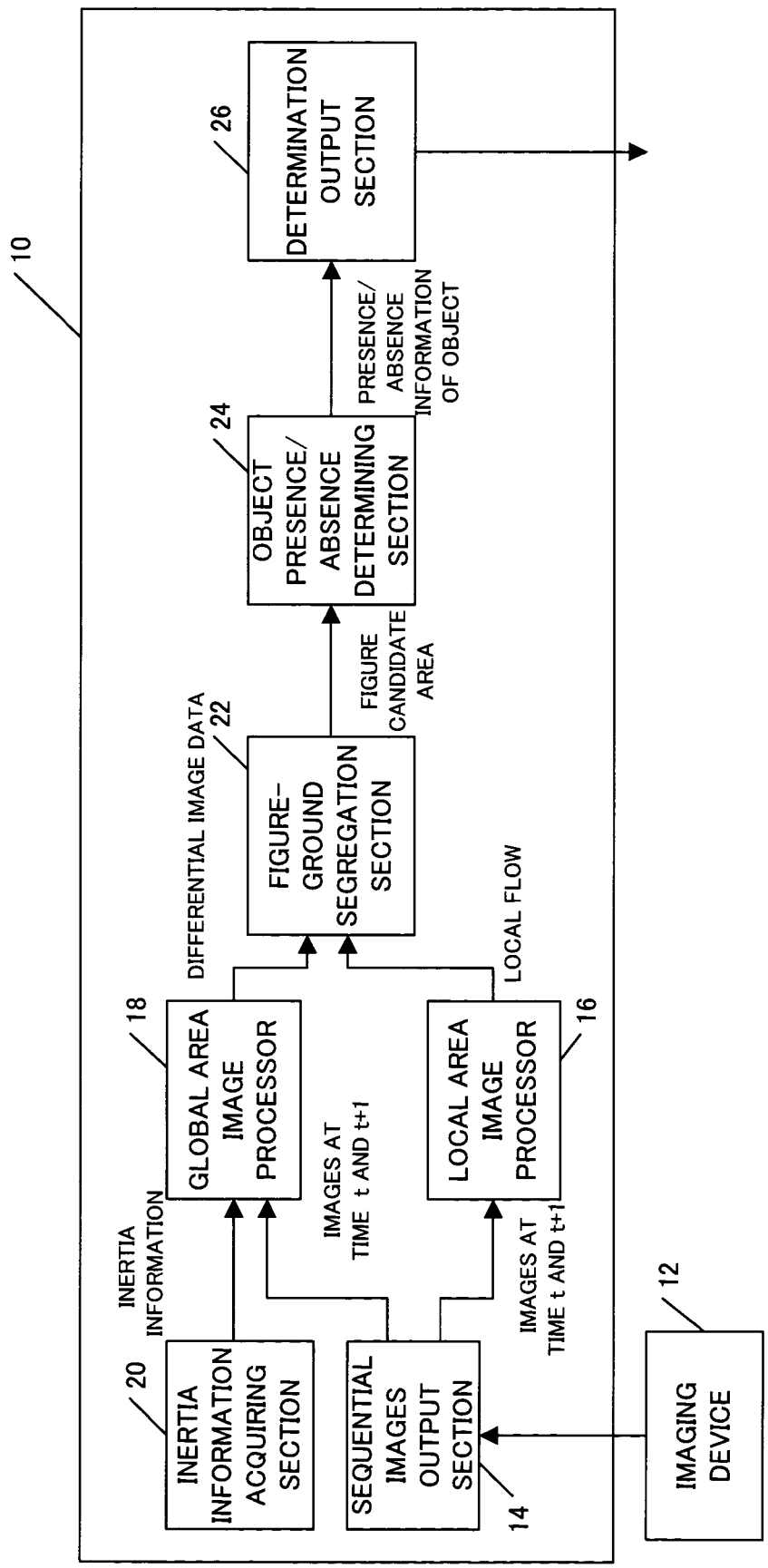
FIG. 1 is a block diagram of an object detection apparatus according to first embodiment of the invention.

FIG. 1 shows a block diagram of an object detection apparatus according to the first embodiment of the invention. The object detection apparatus 10 receives sequential images in the direction of travel which are captured at predetermined time intervals by an imaging device 12, such as a CCD camera, mounted on a mobile unit such as an autonomous traveling vehicle. The device 10 then determines a presence/absence of an object in the image and outputs a determination result. The result signal may be supplied to a motor or a steering wheel of the mobile unit to steer around the object blocking the pass of the mobile unit. Alternatively, the result signal may be notified to passengers on the mobile unit like an autonomous vehicle or to external to the mobile unit.

The object detection apparatus 10 may be implemented by, for example, a microcomputer having at least a CPU for executing various computations, a memory for temporarily storing computation results, a ROM for storing learning results and input/output interface. The object detection apparatus 10 may be mounted on the mobile unit with an imaging device 12. In alternative embodiment, images captured by the imaging device 12 mounted on the mobile unit may be transmitted to a computer outside the unit via any communications means, where the object detection process of the invention is performed. In FIG. 1, the object detection apparatus 10 is illustrated with some functional blocks. A part of or all of the functional blocks may be implemented by software, firmware or hardware.

A sequential images output section 14 makes a train of two or more sequential images captured by the imaging device 12 at predetermined intervals and then provides the train to a local area image processor 16 and a global area image processor 18. The local area image processor 16 divides the at least two images into smaller images (hereinafter referred to as "local areas"). The local area image processor 16 applies Gabor filters to each local area to calculate optical flows in that local area (hereinafter referred to as "local flows"). The local flows are provided to a figure-ground segregation section 22.

An inertia information acquiring section 20 measures some information such as a velocity, a yaw rate or a pitch associated to the self-motion of the mobile unit (hereinafter, referred to as "inertia information") by using various sensors (not shown in FIG. 1), and supplies such information to the global area image processor 18. Based on the two or more sequential images provided by the sequential images output section 14 and the inertia information provided by the inertia information acquiring section 20, the global area image processor 18 calculates characteristics of whole of the images (differential image data described below). This differential image data is provided to the figure-ground segregation section 22.

The figure-ground segregation section 22 uses the differential image data to refine the local flows provided by the local area image processor 16. Based on refined local flows, the figure-ground segregation section 22 further extracts some local areas estimated as "figure" (i.e., areas where possibility of an object existence is high) in the image, which are provided to an object presence/absence determining section 24.

Using clustering method or the like, the object presence/absence determining section 24 determines whether an object actually exists in the local areas estimated as "figure". The determination result is outputted via a determination output section 26.

More detailed process in some functional blocks (that is, the local area image processor 16, the global area image processor 18, the figure-ground segregation section 22 and the object presence/absence determining section 24) will be described below.

Figure 2:
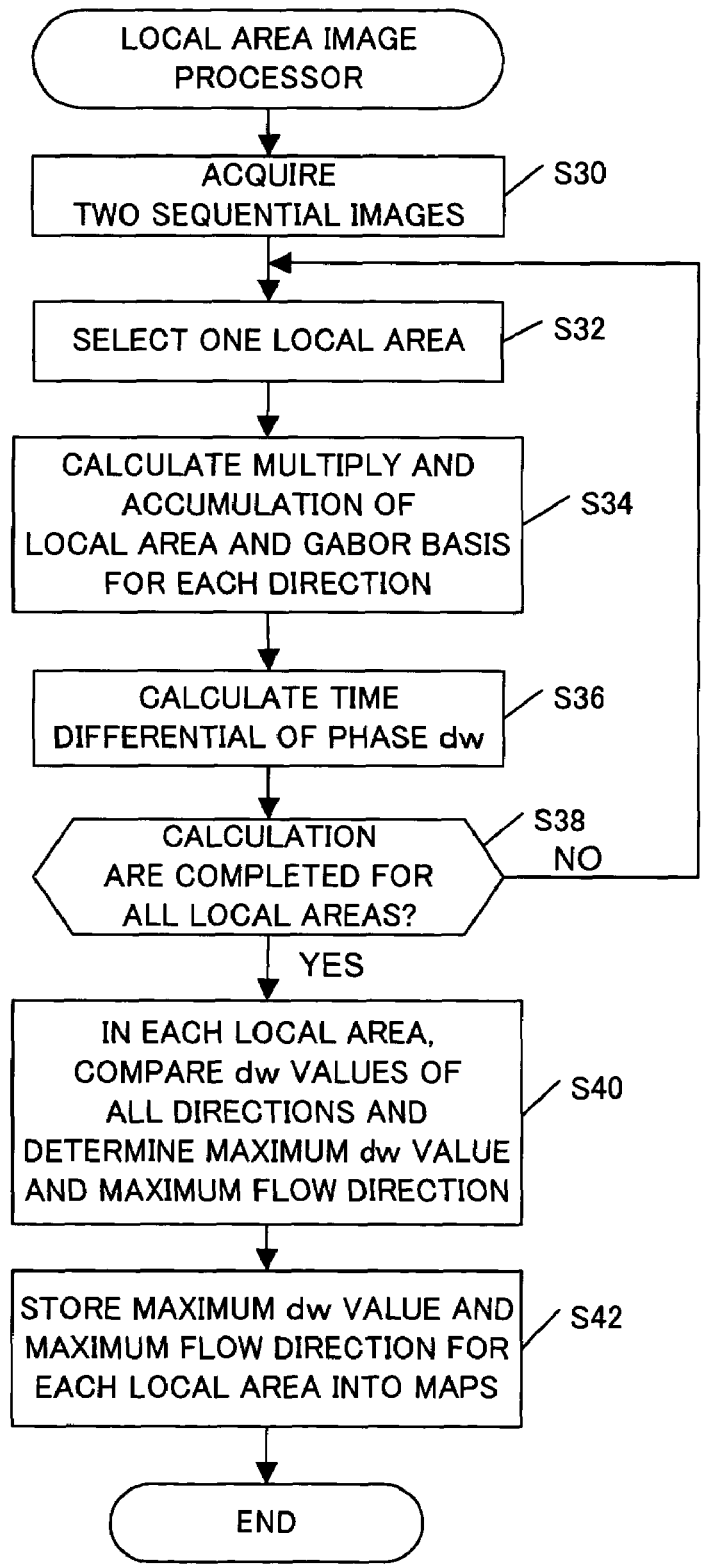
FIG. 2 is a flowchart for process in a local area image processor.

FIG. 2 is a flowchart of process in the local area image processor 16. The local area image processor 16 receives two sequential images from the sequential image output section 14 (S30). In the following description, intensity values of a pixel at coordinates (x,y) in the images captured at time t and t+1 are expressed as Img (x,y,t) and Img (x,y,t+1), respectively. The coordinates (x,y) is orthogonal coordinates with the upper-left corner of the image being an origin point. The intensity value takes on integer values from 0 to 255.

The local area image processor 16 calculates bases of Gabor filters for both positive and negative directions along both x direction and y direction of the image by following equations (S31).

$$Gs(x, y) = 2\sqrt{\frac{\pi}{4.4a^2}} \sin\left(\frac{2\pi x}{a}\right)\exp\left(-\frac{\pi^2 r^2}{4.4a^2}\right) \quad (1)$$

$$Gc(x, y) = 2\sqrt{\frac{\pi}{4.4a^2}} \cos\left(\frac{2\pi x}{a}\right)\exp\left(-\frac{\pi^2 r^2}{4.4a^2}\right)$$

where Gs(x,y) represents a sine component of the basis of Gabor filter, and Gc(x,y) represents a cosine component of the basis of Gabor filter. (x,y) in equations (1) is based on coordinates with the center of the image as an origin point (x, y and r in equation (1) have a relationship of $r=(x^2+y^2)^{1/2}$), which is different from the coordinates (x,y) of the intensity value Img (x,y,t). "a" is a constant and set to a value such that filter sensitivity increases with "a" as a center. Applying two other equations created by rotating the axis of each equation in (1) by 90 degrees, the bases of the Gabor filters of both positive and negative directions along both x and y directions (that is, upward, downward, leftward and rightward direction of the image) are acquired. As described below, by applying Gabor filters to both positive and negative directions of both x and y direction in each local area, it may be clarified which direction the optical flow is heading toward in each local area.

Gabor filters have similar properties to a receptive field of human being. When an object moves in the image, features of optical flows appear more clearly in periphery of the image than center of the image. In this regard, properties of the Gabor filters (such as size of the receptive field, i.e., size of the filter (window)) and spatial frequency may be optimized according to the coordinates (x,y) in the image.

The local area image processor 16 selects one local area from the train of images captured at time t and t+1 (S32). The "local area" herein refers to a small area being part of the image for calculating local optical flows in the image. Each local area is same in size. In one example, size of a whole image captured by the imaging device 12 is 320×240 pixels and size of each local area may be set to 45×45 pixels. An example of the positional relationships between the whole image and local areas is shown in FIG. 3A. In this figure, an outer rectangle represents the whole image and some patterned squares represent the local areas respectively. It is preferable that each local area is positioned so that adjacent local areas overlap each other as shown in FIG. 3A. Overlapping local areas in such way enables pixels around the boundaries of local areas to be included in two or more local areas, thereby more accurate object detection may be realized. However, since the processing speed decreases as overlapping width become wider, an appropriate value should be selected as the overlapping width.

For the first time, the local area image processor 16 selects the local area located at the upper left corner of the image.

The local area image processor 16 performs multiply and accumulation of each pixel Img (x,y,t) and Img (x,y,t+1) included in the selected local area and the bases of Gabor filters. Multiply and accumulation values $x_t$, $x_{t+1}$, $y_t$, and $y_{t+1}$ for all pixels in the given local area are calculated by following equations (S34).

$$x_t = \sum_{x,y} Gs(x, y) \times Img(x, y, t) \quad (2)$$

$$y_t = \sum_{x,y} Gc(x, y) \times Img(x, y, t)$$

$$x_{t+1} = \sum_{x,y} Gs(x, y) \times Img(x, y, t+1)$$

$$y_{t+1} = \sum_{x,y} Gc(x, y) \times Img(x, y, t+1)$$

Then, using these multiply and accumulation values, time differential value of phase "dw", weighted with a contrast $(x^2+y^2)$, is calculated by following equation (S36).

$$dw=\{(x_t+x_{t+1})\times(y_{t+1}-y_t)-(y_t+y_{t+1})\times(x_{t+1}-x_t,0\} \quad (3)$$

By using the bases of Gabor filters along four directions (that is, upward, downward, leftward and rightward) in step S34 and S36, components of four directions of the optical flows are calculated. In other words, dw values in four directions are calculated for one selected local area. These dw values are stored in dw maps, which are prepared separately for each direction. The dw map has an array of plural entries corresponding to the position of local areas in the image. For example, when the whole image includes 5×5 local areas, the dw value in a local area having same patterns as in FIG. 3A is stored in same patterned entry as shown in FIG. 3B.

Once the calculation for one local area is completed, the local area image processor 16 selects next local area in the order shown by arrows in FIG. 3A (S38), and repeats the above-mentioned steps S32 through S36 for all of the remaining local areas.

When the calculations for all local areas are completed, the local area image processor 16 compares four dw values stored in the dw maps for each direction for each local area. The local area image processor 16 selects the largest dw value for each local area. Then, this value is set as a maximum dw value for that local area, and the direction corresponding to the maximum dw value is set as a maximum flow direction for that local area (S40). Then, the maximum dw value is stored in a maximum dw map (see FIG. 5A) having the array similar to the dw map, and the maximum flow direction is stored in a maximum direction map (see FIG. 5B) (S42).

A specific example of the process in the local area image processor 16 is described with reference to FIGS. 4A, 4B, 5A and 5B. FIGS. 4A and 4B show representative dw maps for only two directions (upward and downward) calculated in step S36. Numbers in the dw maps indicates dw values for each local area (some numbers are not shown).

The local area image processor 16 compares dw values in all of the direction maps for each local area and selects the largest one as the maximum dw value for that local area. The direction having the maximum dw value is set as the maximum direction for that local area. For example, when the dw values for the local area located at the upper-left corner of each map in FIGS. 4A and 4B are compared, their values are "3" and "1", respectively. The maximum dw value for this local area becomes "3" and this value is stored in the maximum dw map as maximum dw value (FIG. 5A). Since dw value in the "upward" direction map is "3", the maximum flow direction becomes "upward" and this direction is stored in the maximum direction map (FIG. 5B). In actual application, same process is made for dw values in four directions (that is, upward, downward, leftward and rightward). This process is repeated sequentially for all local areas. It should be noted that, in actual application, though directions in FIG. 5B are shown by arrows for simple illustration, directions are replaced by appropriate numerals for storing.

The maximum dw map acquired by above-mentioned process is provided as local flows to the figure-ground segregation section 22.

Process of the global area image processor 18 and the figure-ground segregation section 22 will be described with reference to a flowchart in FIG. 6.

Figure 7:
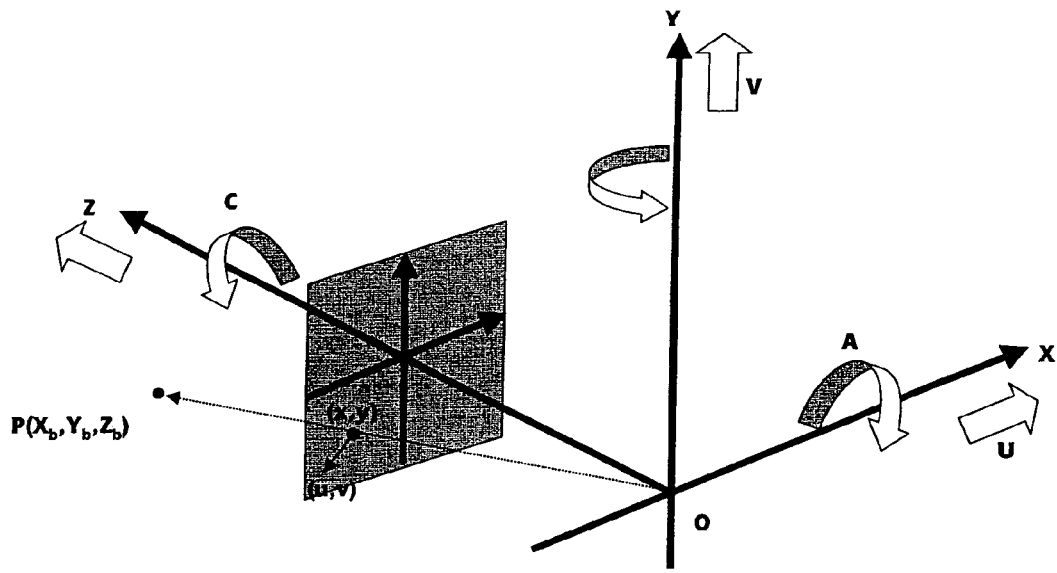
FIG. 7 illustrates exemplary method for estimating a global flow from inertia information.

The global area image processor 18 uses the inertia information provided from the inertia information acquiring section 20 to calculate a motion field of the entire view associated to the self-motion (hereinafter referred to as "global flows") (S50). The principle of this calculation is explained with reference to FIG. 7. First, a 3-dimensional coordinate system (X, Y, Z) used by the imaging device 12 is configured such that the Z-axis coincides with an optical axis of the camera. A surface indicated by Z=f (f is a focus distance) is set as an image capturing surface. Coordinate system (x, y) on the image capturing surface is configured to coincide with X axis and Y axis of the imaging device's coordinate system, respectively. In this case, when the inertia information measured for the imaging device 12 includes rectilinear velocity (U, V, X) and angular velocity (A, B, C), a velocity vector (u, v) at a point (x, y) on the image capturing surface to which a point $P(X_b, Y_b, Z_b)$ on the background is projected is calculated by the following equation:

$$u=(-U/Z-B+C(y/f))-(x/f)(-W/Z-A(y/f)+B(x/f))$$

$$v=(-V/Z-C(x/f)+A)-(y/f)(-W/Z-A(y/f)+B(x/f)) \quad (4)$$

This velocity vector (u, v) is referred to as a global flow.

By using equation (4), global flows may be estimated for each pixel. However, such global flow would be too sensitive to noise in an image. Therefore, in this embodiment, some local areas (for example, 4 vertical areas×4 horizontal areas=16 local areas) are gathered and velocity vectors are acquired for all pixels included in the gathered local areas. Then, these velocity vectors for all pixels are averaged and this average is used as global flow for the gathered local areas. Alternatively, velocity vector of pixel at the center of the gathered local areas may be used as global flow for the gathered local areas.

Figure 6:
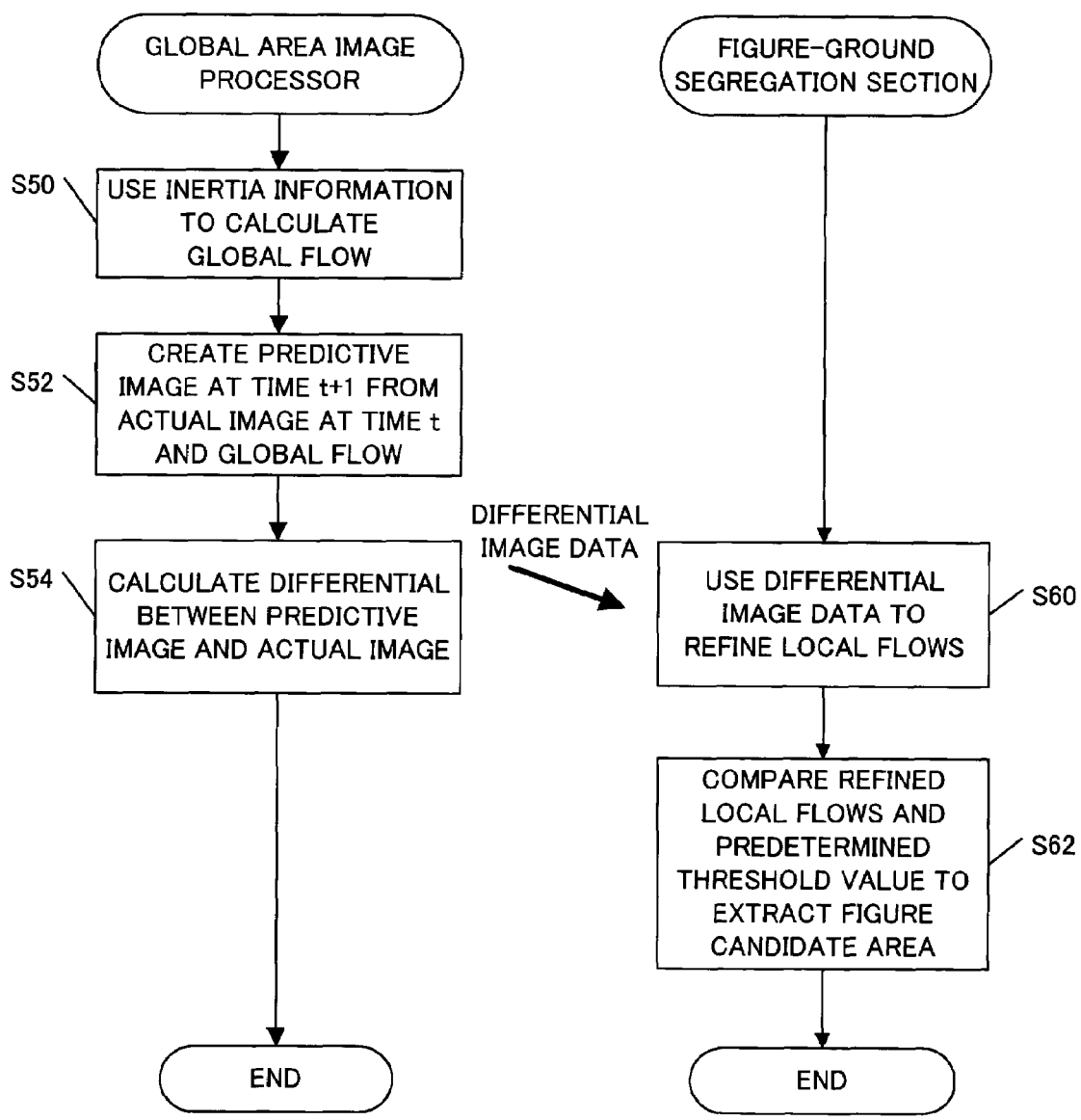
FIG. 6 is a flowchart for process in a global area image processor and a figure-ground segregation section in FIG. 1.
Figure 8:
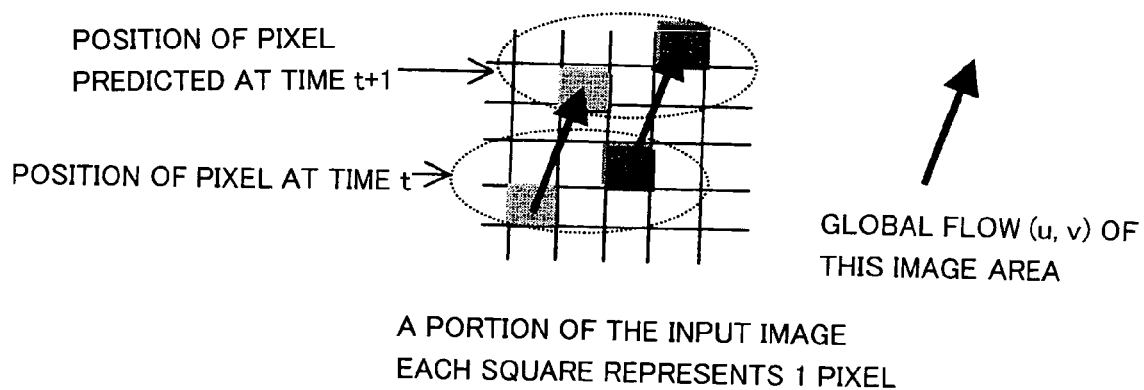
FIG. 8 illustrates a warp estimation method.

Back to FIG. 6, the global area image processor 18 uses the global flows to create an image at time t+1 based on the image at time t (S52). More specifically, a predictive image at time t+1 may be created by displacing the coordinate of each pixel in the image at time t by the corresponding global flow (u, v) (see FIG. 8). This approach is referred to as "warp estimation method".

The global area image processor 18 then compares intensity values of pixels of the predictive image at time t+1 and those of an actual image at time t+1, which is provided from the sequential images output section 20, for each pixel at same position in the image. The global area image processor 18 calculates absolute differential values of the intensity value per pixel between the predictive image and the actual image for all pixels (S54). Hereinafter, this is referred to as "differential image data". The differential image data is provided to the figure-ground segregation section 22.

The figure-ground segregation section 22 uses the differential image data to refine the local flows (S60). First, the differential image data is divided to local areas same as in the input image. Absolute of average of the differential values is calculated for pixels included in each local area. A coefficient m which is proportionate to the average is multiplied by each dw value stored at each corresponding local area in the maximum dw map.

$$RLF=m \times LF/255 \quad (5)$$

where "LF" represents the dw value in each local area in the maximum dw map, "RLF" represents refined dw value. The refined dw value replaces the dw value in the maximum dw map. The refined dw value is referred to as "refined local flows".

The figure-ground segregation section 22 compares the refined local flows with a predetermined threshold value for each local area (S62). Then, set of local areas having the refined local flows that are greater than the threshold value is extracted as an area estimated as "figure" (hereinafter referred to as a "figure candidate area") (S62) and this figure candidate area is provided to the object presence/absence determining section 24. Thus, at the figure-ground segregation section 22, local flows are enhanced by using the differential image data.

Since global flows are estimated based on the inertia information which have no relation with the captured image, the global flows represent the motion of pixels inside the image when assuming that no objects are present inside the image. Therefore, regardless of whether the mobile unit is moving or at rest, the image of the area where any object exists does not match the predictive image and the value of the differential image data for that area become large. In other words, the part where the value of the differential image data is small indicates that the local flows acquired from the two sequential images and the global flows have similar motion components, that is, the motion of that part of the image is close to the self-motion of the mobile unit. Therefore, the figure-ground segregation section 22 estimates this part as "ground". Conversely, a part where the value of the differential image data is relatively large indicates that there is some motion different from the self-motion of the mobile unit. Therefore, the figure-ground segregation section 22 estimates this part as "figure".

The object presence/absence determining section 24 performs clustering method on local areas within the figure candidate area and determines the presence or absence of the object in the image.

Among the local areas which are determined as the figure candidate area, the object presence/absence determining section 24 incorporates local areas where the distance between the local areas is less than a predetermined threshold value into same cluster. The object presence/absence determining section 24 determines whether other local area is incorporates into any cluster depending on the distance between the cluster and the other local area. When all local areas belong to any clusters, a cluster containing more numbers of local areas than a predetermined value is left and other clusters are removed as noise. When any cluster is still left, the object presence/absence determining section 24 determines that objects exist in the image. When no cluster is left, it is determined that any object does not exist in the image. Any known method may be employed for clustering.

As described above, the object detection apparatus 10 according to the first embodiment may detect objects in a image without any advance learning in some environment like global flows may be estimated from inertia information (for example, when a mobile unit travels on a flat surface).

Second Embodiment of the Invention

Figure 9:
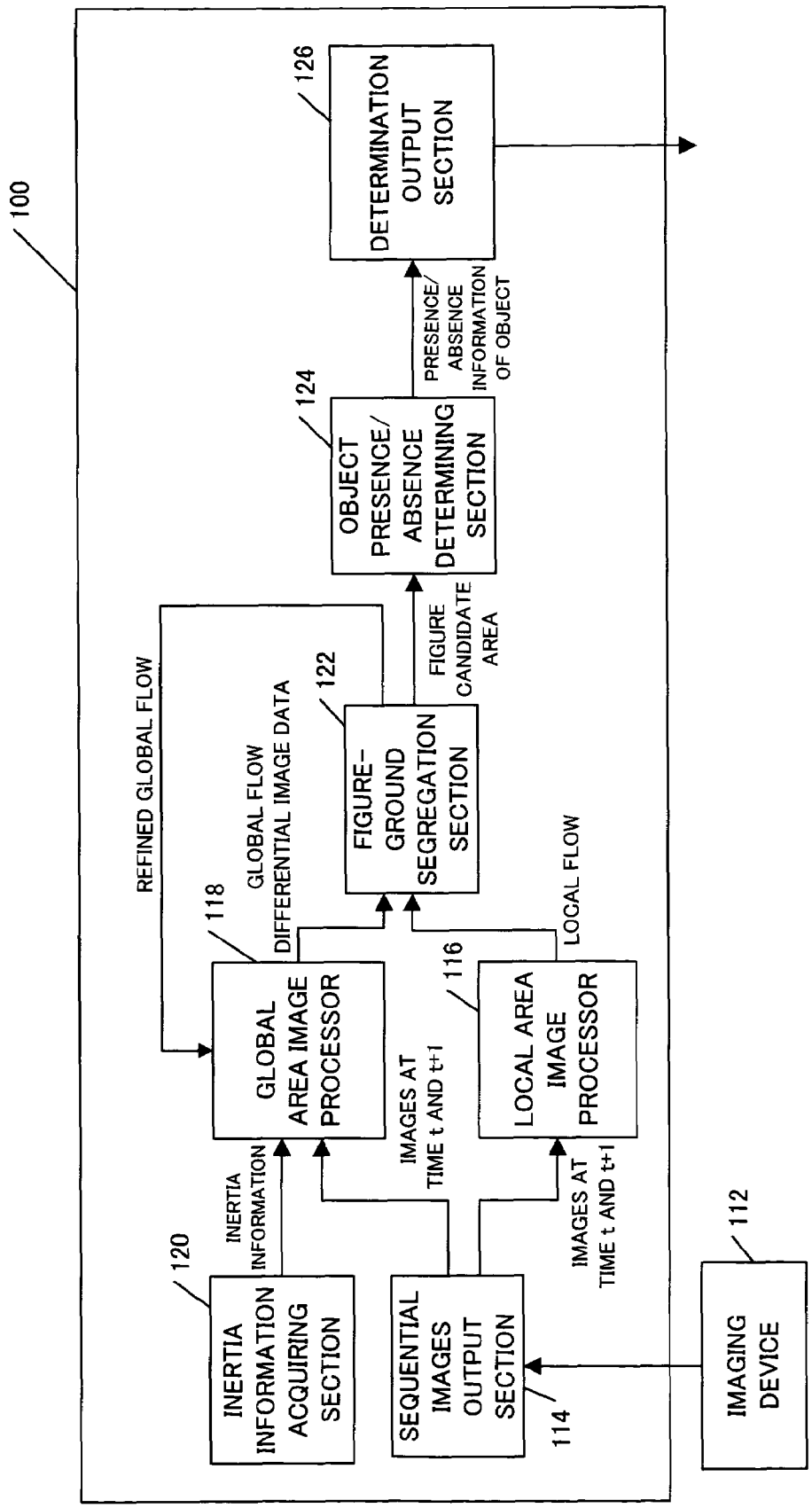
FIG. 9 is a block diagram of an object detection apparatus according to second embodiment of the invention.

FIG. 9 is a block diagram of an object detection apparatus 100 according to second embodiment of the invention. A sequential images output section 114, a local area image processor 116, an inertia information acquiring section 120, an object presence/absence determining section 124 and a determination output section 126 are same with corresponding function blocks of the first embodiment. Process in a global area image processor 118 and a figure-ground segregation section 122 is different from the corresponding process in the first embodiment. In contrast to the first embodiment, there is feedback from the figure-ground segregation section 122 to the global area image processor 118. Therefore, only processes in the global area image processor 118 and the figure-ground segregation section 122 will be described below with reference to flowcharts in FIG. 10.

Process in steps S130 to S134 is same with steps S50 to S54 in FIG. 6. Global flows estimated in step S130 and differential image data calculated in step S134 are provided to the figure-ground segregation section 122.

Figure 11:
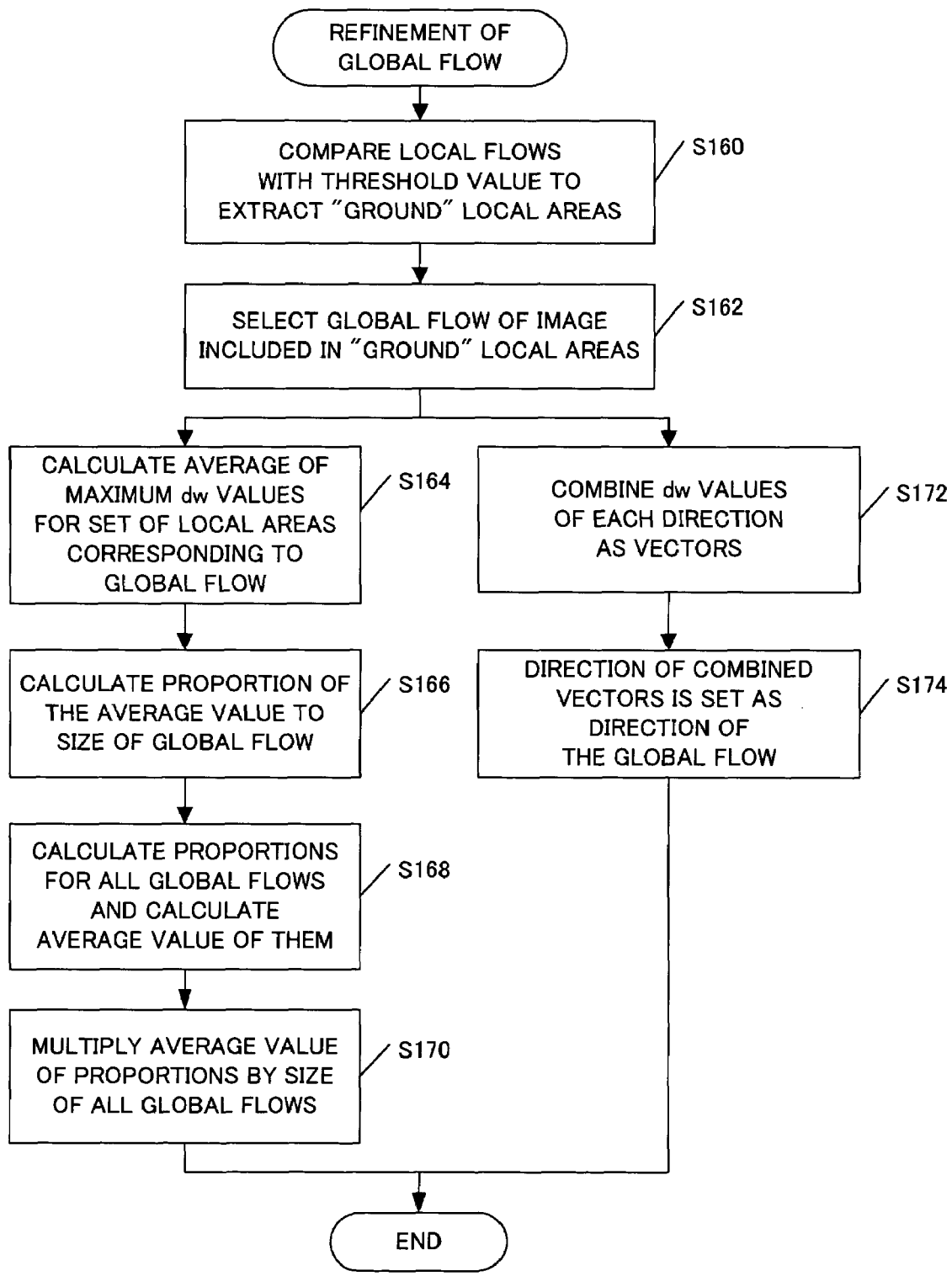
FIG. 11 is a flowchart for refining global flows.

The figure-ground segregation section 122 uses the differential image data and local flows received from the local area image processor 116 to refine the global flows (S150) as shown in FIG. 11.

The figure-ground segregation section 122 first compares local flow of each local area with a predetermined threshold value and extracts local areas with local flows smaller than the threshold value as "ground" (S160). The figure-ground segregation section 122 then selects the size and the direction of the global flows for the image included in the local areas estimated as "ground" to be refined (S162).

First, refinement of the size of the global flow is described below. Maximum dw values area are retrieved from a maximum dw map for local areas corresponding to the selected global flow and average of the maximum dw values is calculated (S164). Proportion of the average to the size of the global flow is calculated (S166). This calculation is performed for all global flows in the image included in the local areas estimated as "ground". Average of the proportions is calculated (S168). This average is multiplied by the size of all global flows included in the image to refine the size of global flows (S170).

Next, refinement of the direction of the global flows is described below. dw values of each local area are retrieved from direction maps for local areas corresponding to the selected global flow. The dw values are combined as vectors having direction angle thereof (S172). The direction of the composed vector is set as refined direction of corresponding global flow (S174).

The global flows having refined size and refined direction (hereinafter referred to as "refined global flows") are sent to the global area image processor 118.

Figure 10:
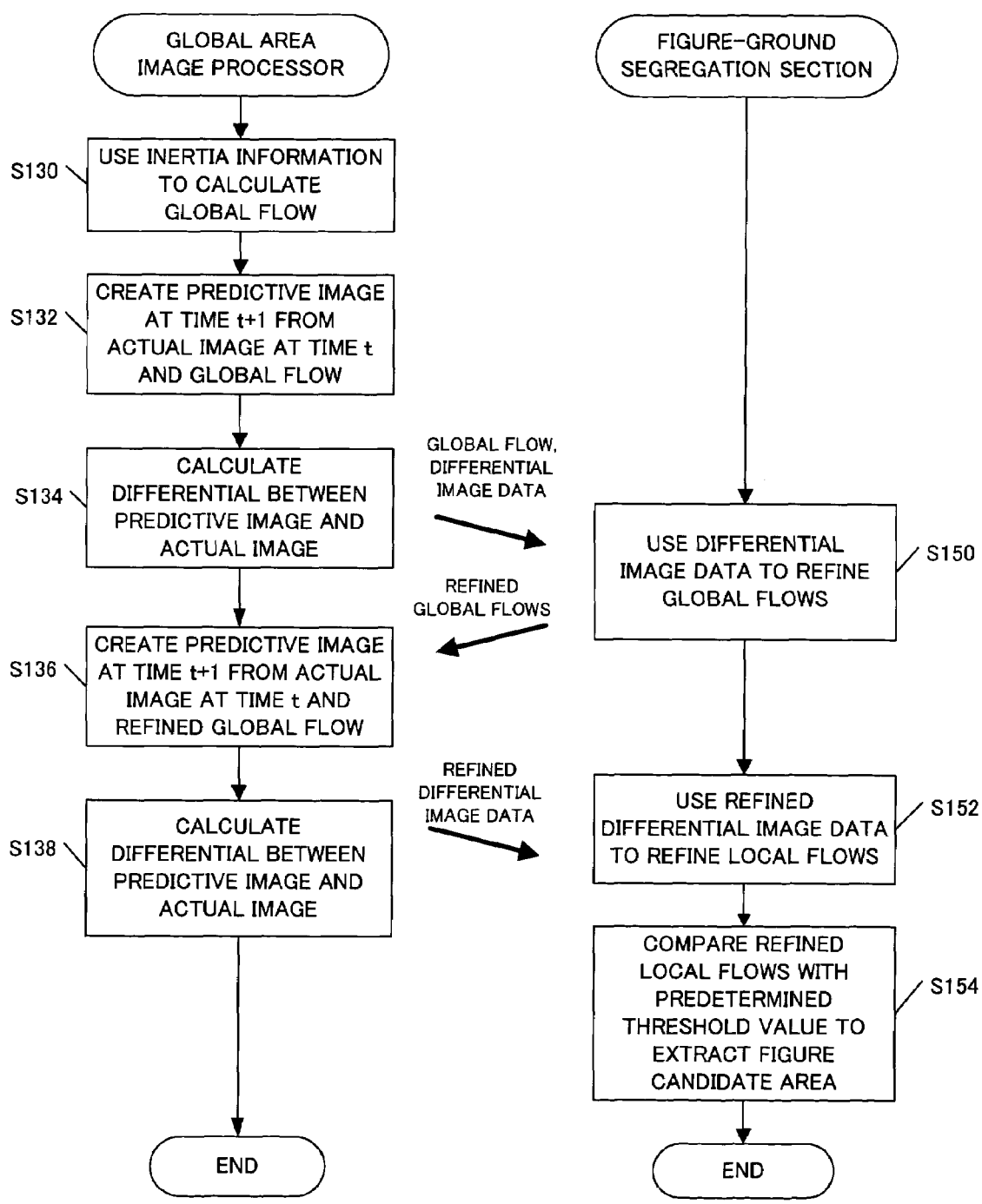
FIG. 10 is a flowchart for process in a global area image processor and a figure-ground segregation section in FIG. 9.

Back to FIG. 10, the global area image processor 118 uses the image at time t and the refined global flows to create a predictive image at time t+1 by using warp estimation method mentioned above (S136). A differential between this predictive image and the actual image at time t+1 is used to recalculate differential image data (S138), which is referred to as "refined differential image data". The refined differential image data is sent to the figure-ground segregation section 122.

The figure-ground segregation section 122 uses the refined differential image data to refine the local flows (S152) in same way as in step S60 and extracts a figure candidate area based on the refined local flows (S154). Following process is same as in the first embodiment.

Thus, according to the second embodiment of the invention, global flows estimated by using inertia information and local flows calculated for local area are mutually referenced and refined, thereby accuracy of detecting objects in an image is improved.

Third Embodiment of the Invention

In this embodiment, a mobile unit carrying an imaging device 12 travels an environment in advance for detecting objects, captures images in the direction of motion and constructs a self-motion predictive space described below (hereinafter this process is referred to as "learning".) When the object detection is executed, past image and present image are projected onto the self-motion predictive space and reconstruct them to create a predictive image.

Figure 12:
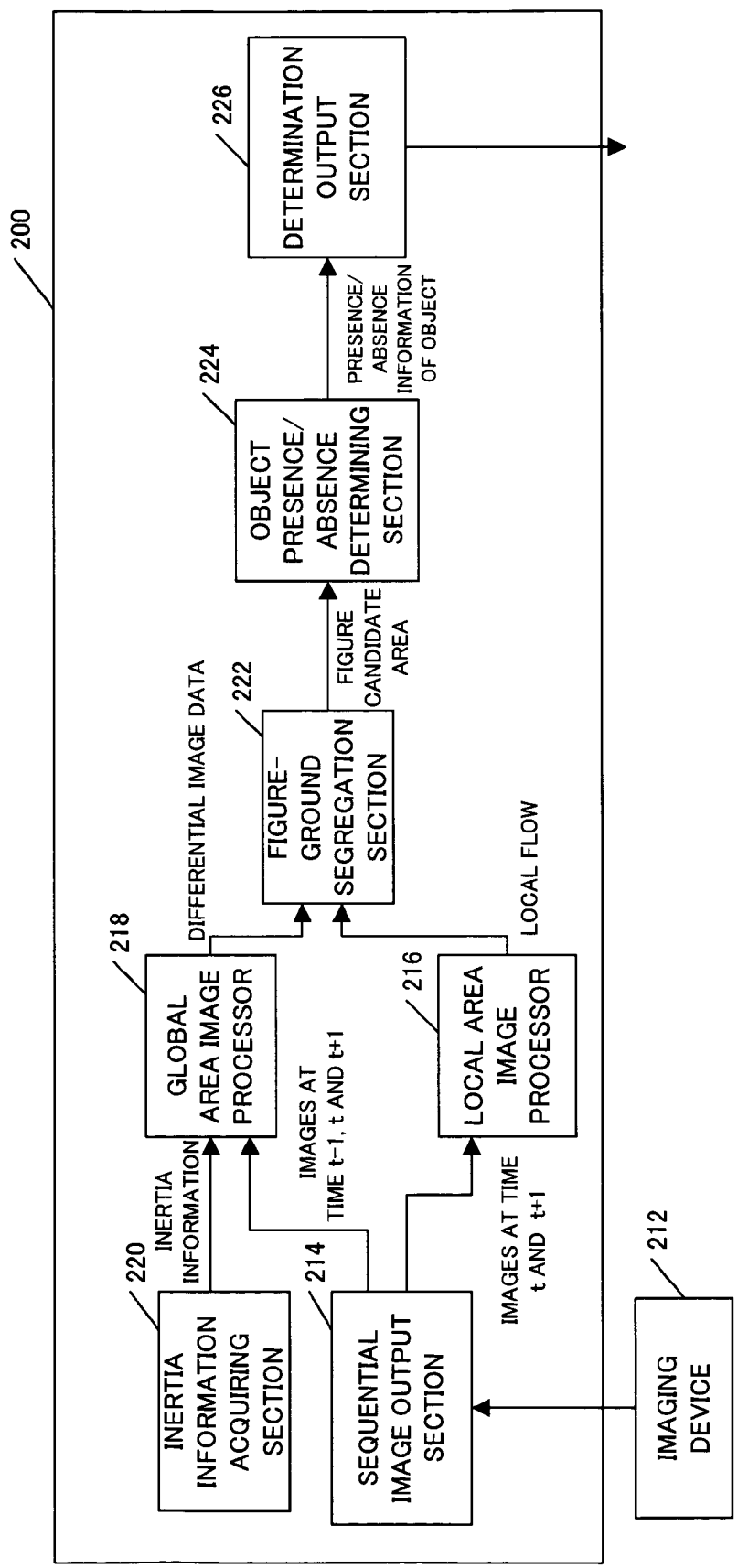
FIG. 12 is a block diagram of an object detection apparatus according third embodiment of the invention.

FIG. 12 is a block diagram showing an overall configuration of an object detection apparatus 200 according to the third embodiment. Except for a global area image processor 218, process in each corresponding functional block is same with those of the object detection apparatus 10 according to the first embodiment shown in FIG. 1. Hereinafter process in the global area image processor 218 will be described with reference to FIGS. 13 and 14.

Figure 13:
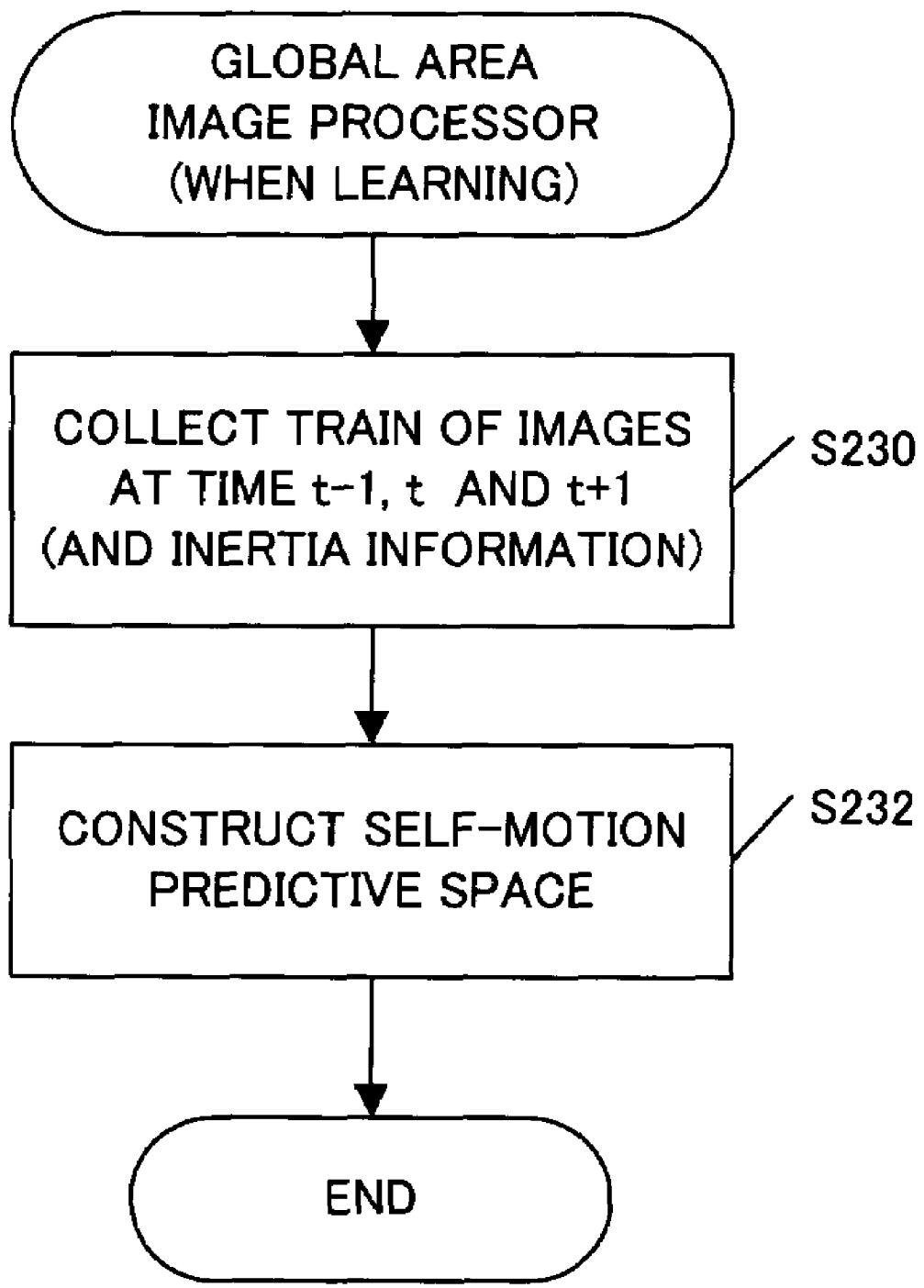
FIG. 13 is a flowchart for process in a global area image processor in FIG. 12 when learning.

FIG. 13 is a flowchart in learning process. The global area image processor 218 travels the environment for executing object detection, captures images in the motion direction in advance and constructs a self-motion predictive space from the images.

The global area image processor 218 receives a train of three sequential images at time t−1, t and t+1 from a sequential images output section 214 (S230). A necessary number of the trains of sequential images are collected during a given period. When the collection is completed, a KL transform is performed on a vector composed of these three images to produce an eigenspace (the self-motion predictive space) (S232). At this time, the inertia information from an inertia information acquiring section 220 may be included as well when performing the KL transform to construct the self-motion predictive space.

Figure 14:
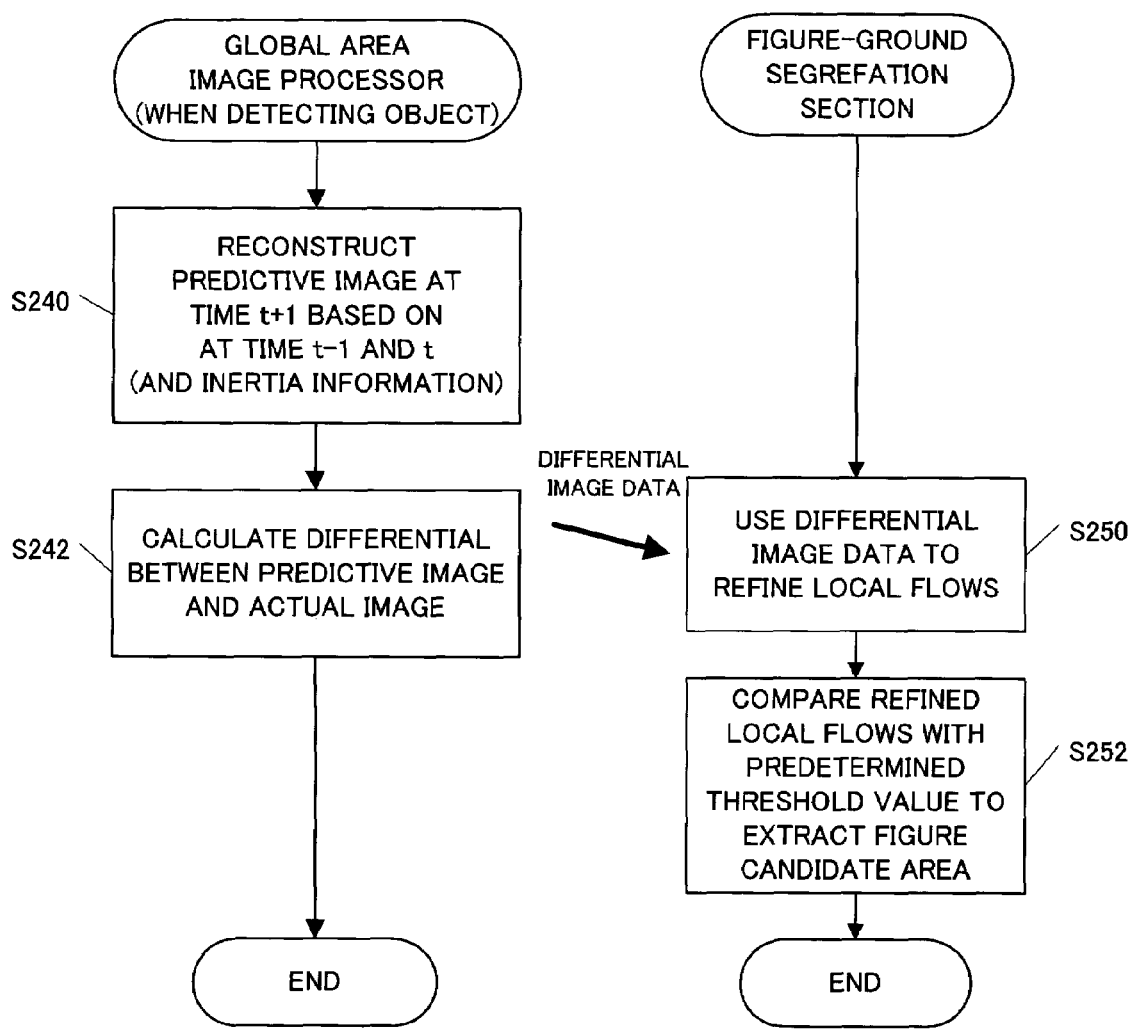
FIG. 14 is a flowchart for process in the global area image processor and a figure-ground segregation section in FIG. 12 when detecting objects.

FIG. 14 is a flowchart of the object detecting process. During this process, the global area image processor 218 travels an environment that is identical or similar to the environment of the self-motion predictive space, and the train of images at time t−1 and time t is received from the sequential images output section 214. Then, the train of images at time t−1 and time t is projected onto the self-motion predictive space to accomplish the reconstruction so that the predictive image at time t+1 is created (S240). Specifically, the input vector of the images at time t−1 and time t are sequentially multiplied by the main component vector constituting the self-motion predictive space constructed using the above-mentioned KL transform to calculate the coordinates of the self-motion predictive space. Based on these three coordinates, the three sequential image train can be reconstructed and the portion corresponding to the image of time t+1 is cut out to acquire the predictive image.

In the case where the inertia information calculated in step S232 is also included when performing the KL transform, the inertia information is included at the execution time as well to perform the reconstruction.

Then, similarly to the first embodiment described above, the predictive image at time t+1 and the actual image at time t+1 provided from the sequential images output section 214 are compared, and the differential image data is calculated (S242). The subsequent process in a figure-ground segregation section 222 (S250 through S252) is the same as in the first embodiment.

In this way, according to the third embodiment, even in the environment where the above-mentioned warp estimation method is not applicable (for example, such as when the mobile unit travels an uneven surface. In this case, it is impossible to displace pixels by global flows to create the predictive image), the mobile unit travels the same or similar environment in advance and constructs a self-motion predictive space as information acquired by the learning process, thereby enabling the object detection.

Fourth Embodiment of the Invention

Similarly to the third embodiment, before executing the object detection, the mobile unit carrying the imaging device 12 travels the course for the object detection, captures images along the direction of motion, and constructs a self-motion predictive space. When executing the object detection, a past image and a present image are projected onto the self-motion predictive space to reconstruct an eigenspace. Thus, a predictive image and global flows may be created.

Figure 15:
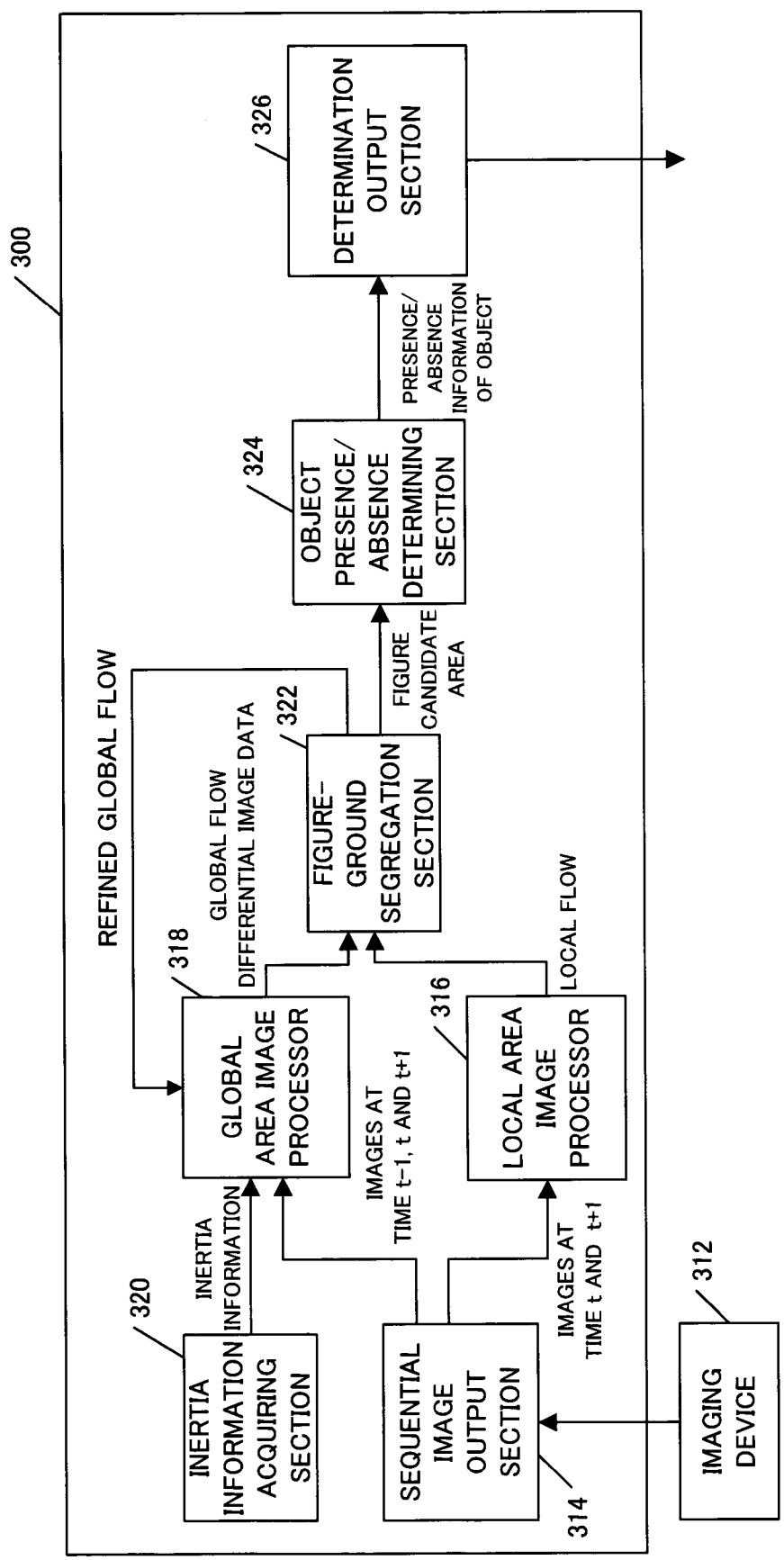
FIG. 15 is a block diagram of an object detection apparatus according to fourth embodiment of the invention.

FIG. 15 is a block diagram showing an object detection apparatus 300 according to the fourth embodiment of the invention. Except a global area image processor 318, process in corresponding blocks of the object detection apparatus 100 is same as in the second embodiment. Therefore, only the process in the global area image processor 318 will be described with reference to FIGS. 16 and 17.

Figure 16:
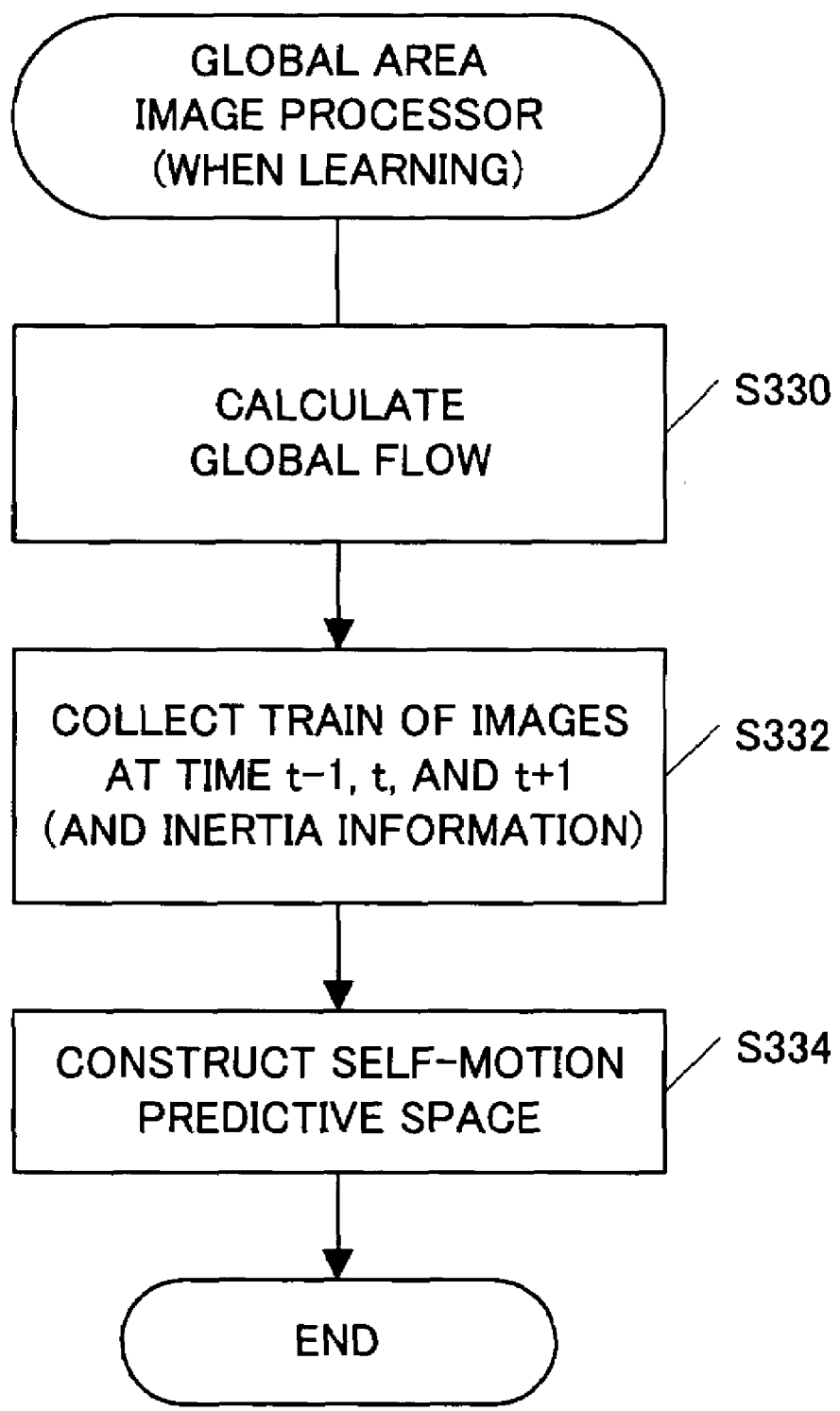
FIG. 16 is a flowchart for process in a global area image processor in FIG. 15 when learning.

FIG. 16 is a flowchart of the learning process. During this process, the global area image processor 318 receives images captured along the direction of motion on the environment for the object detection and constructs a self-motion predictive space from the images. The global area image processor 318 estimates global flows at time t by any method (S330). The global area image processor 318 receives the train of three sequential images at time t−1, time t, and time t+1 from a sequential images output section 314 (S332). A necessary number of the trains of the sequential images are collected over a given period. When the collection is completed, KL transform is performed on a vector composed of the three sequential images and the corresponding global flow to construct the self-motion predictive space (S334). The inertia information may also be included in the combination when constructing the self-motion predictive space.

Figure 17:
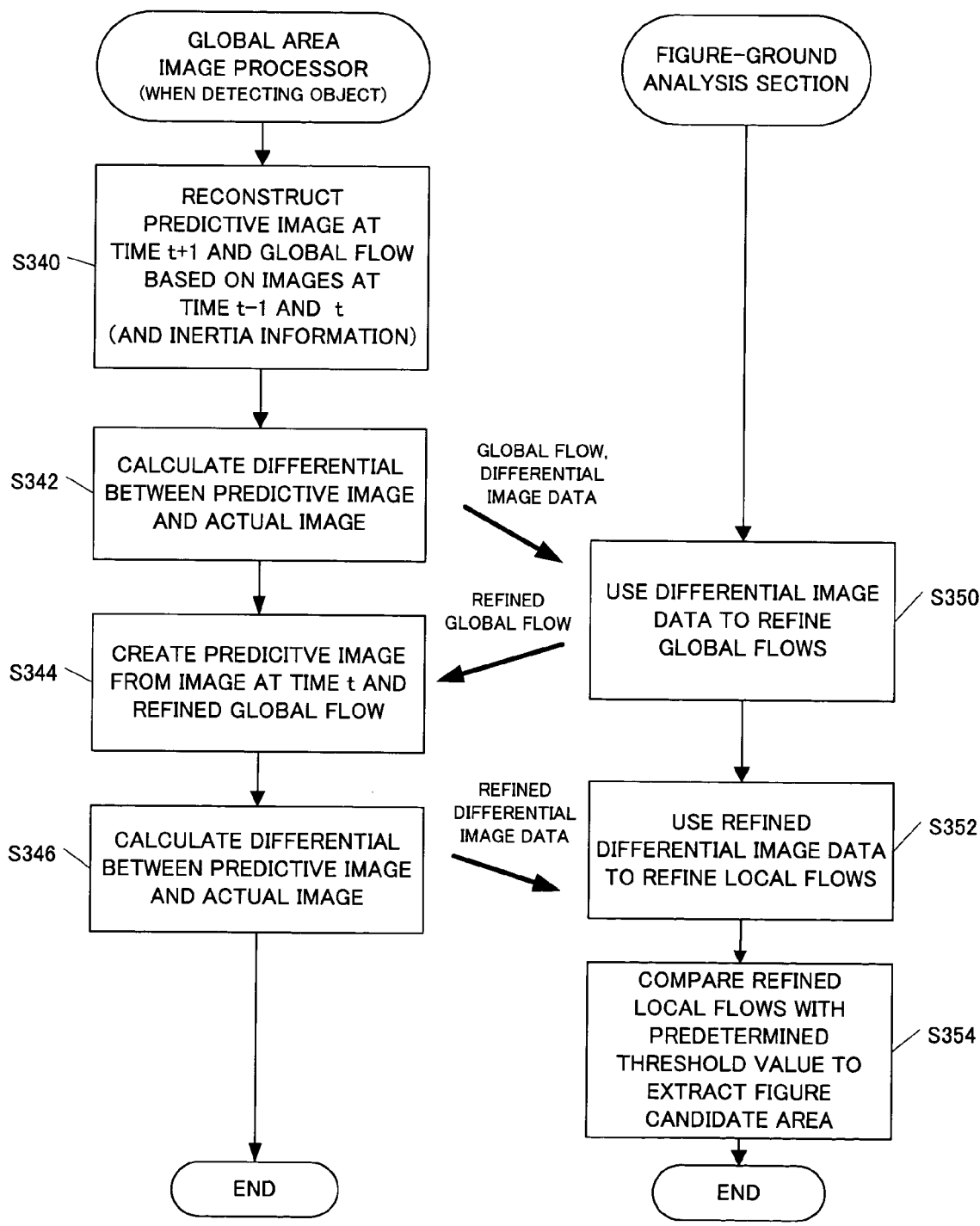
FIG. 17 is a flowchart for process in the global area image processor and a figure-ground segregation section in FIG. 15 when detecting objects.

FIG. 17 is a flowchart of the object detecting process. During this process, the mobile unit travels same or similar environment as in learning and the global area image processor 318 receives the train of actual images at time t−1 and time t from the sequential images output section 314. Then, the train of actual images at time t−1 and time t are projected onto the self-motion predictive space, and the reconstruction similar to as described in the above-mentioned S240 is performed, to create the predictive image at time t+1 and the global flow (S340). The predictive image at time t+1 and the actual image at time t+1 actually from the sequential images output section 314 are compared and a differential image data between them is calculated (S342). The differential image data and the global flow are provided to a figure-ground segregation section 322.

The figure-ground segregation section 322, similarly to the second embodiment described above, uses the differential image data and local flows received from a local area image processor 316 to refine the global flow (S350). Based on the image at time t and the refined global flow, the global area image processor 318 uses the above-mentioned warp estimation method to create a predictive image at time t+1 (S344). Then, based on this predictive image and the actual image at time t+1, the differential image data is re-created (S346). The following process by a figure-ground segregation section 322 (S352) through S354) is the same as in the second embodiment.

Thus, according to the fourth embodiment, the global flow is used to construct the self-motion predictive space when learning. Therefore, even without performing the calculations such as in equation (4) when executing the object detection, both of the predictive image and the global flow may be created.

The description will be made of a variety of embodiments. However, the invention is not restricted to those embodiments.

According to the present invention, a global area image process for calculating differential image data for roughly segregating "figure" and "ground" in input images and a local area image process for calculating local flows in the input image are executed in parallel, and both processing results are mutually referenced, thereby enabling high-speed and accurate object detection. In addition, by utilizing the inertia information of the imaging device, the accuracy of the object detection may be improved.

What is claimed is:

1. An object detection apparatus for detecting objects based on visual images captured by a self-moving unit, the object detection apparatus comprising:

a sequential images output section for making a train of a first input image and a second input image sequential to the first input image and outputting said train;

a local area image processor for calculating local flows based on said first input image and said second input image;

an inertia information acquiring section for measuring self-motion of the unit to calculate inertia information thereof;

a global area image processor for using said inertia information to estimate global flow, which is a motion field of the entire view associated to the self-motion, using said global flow and said first input image to create a predictive image of said second input image and calculating differential image data, said differential image data being a difference between said predictive image and said second input image;

a figure-ground segregation section for using said differential image data to refine said local flows, comparing the refined local flows with a predetermined threshold value to extract a figure candidate area, said figure candidate area being the area having a high probability of an object existing in the input image; and an object presence/absence determination section for determining presence/absence of objects in said figure candidate area.

2. An object detection apparatus for detecting objects based on visual images captured by a self moving unit, the object detection apparatus comprising:

a sequential images output section for making a train of a first input image and a second input image sequential to the first input image and outputting said train;

a local area image processor for calculating local flows based on said first input image and said second input image;

an inertia information acquiring section for measuring self-motion of the unit to calculate inertia information thereof;

a global area image processor for using said inertia information to estimate global flow, which is a motion field of the entire view associated to the self motion, using said global flow and said first input image to create a predictive image of said second input image and calculating differential image data, said differential image data being a difference between said predictive image and said second input image;

a figure-ground segregation section for using said differential image data to refine said local flows, an object presence/absence determination section for determining presence/absence of objects in said figure candidate area, wherein said global area image processor uses the refined global flow and said first input image to re-create a predictive image of said second input image and calculates a refined differential image data, said refined differential image data being a difference between the re-created predictive image and said second input image; and wherein said figure-ground segregation section uses said refined differential image data to refine said local flows, compares the refined local flows with a predetermined threshold value to extract a figure candidate area, said figure candidate area being local areas having a high probability of objects existing in the input image.

3. The object detection apparatus according to claim 2, wherein said global area image processor employs a warp estimation method, said warp estimation method comprising creating said predictive image by warp-converting said first input image based on the shift of each pixel calculated from said global flow.

4. A object detection apparatus for detecting objects based on visual images captured by a self moving unit, the object detection apparatus comprising:

a sequential images output section for making a train of a first input image, a second input image and a third input image sequential to the first input image and outputting said train;

a local area image processor for calculating local flows based on said first input image and said second input image;

a global area image processor for constructing an eigenspace for the input image in advance, projecting said first input image and said second input image on said eigenspace to create a predictive image of said third input image, and calculating differential image data which is a difference between said predictive image and said third input image;

a figure-ground segregation section for using said differential image data to refine said local flows, comparing the refined local flows with a predetermined threshold value to extract a figure candidate area, said figure candidate area being the area having a high probability of objects existing in the input image; and an object presence/absence determining section for determining a presence/absence of objects in said figure candidate area.

5. An object detection apparatus for detecting objects based on visual images captured by a self-moving unit, the object detection apparatus comprising:

a sequential images output section for making a train of a first input image, a second input image and a third input image sequential to the first input image and outputting said train;

a local area image processor for calculating local flows based on said first input image and said second input image;

an inertia information acquiring section for measuring motion of the unit and to calculate inertia information thereof;

a global area image processor for using said inertia information to estimate global flow, which is a motion field of the entire view associated to the self motion, constructing an eigenspace for the input images and said global flow in advance, projecting said first input image and said second input image on said eigenspace to create a predictive image of said third input image and said global flow, and calculating differential image data which is a difference between said predictive image and said third input image;

a figure-ground segregation section for using said differential image data and said local flows to refine said global flow;

wherein said global area image processor uses the refined global flow and said second input image to re-create a predictive image of said third input image and calculates a refined differential image data, said refined differential image data being a difference between the re-created predictive image and said third input image;

wherein said figure-ground segregation section uses said differential image data to refine said local flows, compares the refined local flows with a predetermined threshold value to extract a figure candidate area, said figure candidate area being local areas having a high probability of objects existing in the input image; and said object detection apparatus further comprising an object presence/absence determining section for determining a presence/absence of objects in said figure candidate area.

6. The object detection apparatus according to claim 5, wherein said local flows are optical flows calculated by applying Gabor filters to each local area in the input image.

7. The object detection apparatus according to claim 5, wherein said object presence/absence determining section performs clustering method of said figure candidate area, and determines that the object exists in the image when some figure candidate area still remains.

8. An object detection method for detecting objects based on visual images captured by a self moving unit, the object detection method comprising:

making a train of a first input image and a second input image sequential to the first input image to output said train;

calculating local flows based on said first input image and said second input image;

measuring self-motion of the unit to calculate inertia information thereof;

estimating global flow, which is a motion field of the entire view associated to the self-motion by using said inertia information;

creating a predictive image of said second input image by using said global flow and said first input image;

calculating differential image data, said differential image data being a difference between said predictive image and said second input image;

refining said local flows by using said differential image data;

comparing the refined local flows with a predetermined threshold value to extract a figure candidate area, said figure candidate area being the area having a high probability of an object existing in the input image; and determining presence/absence of objects in said figure candidate area.

9. An object detection method for detecting objects based on visual images captured by a self-moving unit, the object detection method comprising:

making a train of a first input image and a second input image sequential to the first input image to output said train;

calculating local flows based on said first input image and said second input image;

measuring self-motion of the unit to calculate inertia information thereof;

calculating global flow, which is a motion field of the entire view associated to the self-motion, by using said inertia information;

creating a predictive image of said second input image by using said global flow and said first input image;

calculating differential image data, said differential image data being a difference between said predictive image and said second input image;

refining said global flow by using said differential image data and said local flows;

re-creating a predictive image of said second input image by using the refined global flow and said first input image;

calculating a refined differential image data which is a difference between the re-created predictive image and said second input image;

refining said local flows by using the refined differential image data;

comparing the refined local flows with a predetermined threshold value to extract a figure candidate area, said figure candidate area being local areas having a high probability of objects existing in the input image; and determining presence/absence of objects in said figure candidate area.

10. The object detection method according to claim 9, wherein said creating the predictive image further comprises warp-converting said first input image based on the shift of each pixel calculated from said global flow.

11. An object detection method for detecting objects based on visual images captured by a self-moving unit, the object detection method comprising:

making a train of a first input image, a second input image and a third input image sequential to the first input image to output said train;

calculating local flows based on said first input image and said second input image;

constructing an eigenspace for said input image in advance, projecting said first input image and said second input image on said eigenspace to create a predictive image of said third input image;

calculating differential image data which is a difference between said predictive image and said third input image;

refining said local flows by using said differential image data;

comparing the refined local flows with a predetermined threshold value to extract a figure candidate area, said figure candidate area being the area having a high probability of objects existing in the input image; and determining a presence/absence of objects in said figure candidate area.

12. An object detection method for detecting objects based on visual images captured by a self moving unit, the object detection method comprising:

making a train of a first input image, a second input image and a third input image sequential to the first input image to output said train;

calculating local flows based on said first input image and said second input image;

measuring self-motion of the unit to calculate inertia information thereof;

calculating global flow, which is a motion field of the entire view associated to the self-motion, by using said inertia information;

constructing an eigenspace for the input images and said global flow in advance;

projecting said first input image and said second input image on said eigenspace to create a predictive image of said third input image and said global flow;

calculating differential image data which is a difference between said predictive image and said third input image;

refining said global flow by using said differential image data and said local flows;

re-creating a predictive image of said third input image by using the refined global flow and said second input image;

calculating a refined differential image data, said refined differential image data being a difference between the re-created predictive image and said third input image;

refining the local flows by using the differential image data;

comparing the refined local flows with a predetermined threshold value to extract a figure candidate area, said figure candidate area being local areas having a high probability of objects existing in the input image; and determining a presence/absence of objects in said figure candidate area.

13. The object detection apparatus according to claim 12, wherein said local flows are optical flows calculated by applying Gabor filters to each local area in the input image.

14. The object detection apparatus according to claim 12, wherein said determining presence/absence of the object further comprises performing clustering method of said figure candidate areas and determining that the object exists in the image when some figure candidate area still remains.

15. An object detection apparatus for detecting objects in input images captured by an image capturing device carried by a moving unit, the apparatus comprising:

means for producing a set of images comprising a current image and one or more preceding past images;

a local area image processor for calculating local flows from said set of images;

a global area image processor for creating a predictive image of the current image from the movement of the image capturing device and past images, and for calculating differential image data, said differential image data being a difference between the predictive image and the current image;

a figure-ground segregation means for modifying the local flows based on the differential image data, and for identifying a figure candidate area by determining the modified local flows that have larger value than a predetermined threshold value, said figure candidate area being the area having a high probability of an object existing in the input image; and means for determining presence or absence of objects in said figure candidate area.

* * * * *